United States Patent [19]

Wrabel et al.

[11] Patent Number: 5,686,001

[45] Date of Patent: Nov. 11, 1997

[54] VARIABLE POLARITY ARC TECHNOLOGY FOR THE REPAIR OF COATED ARTICLES

[75] Inventors: Peter Wrabel, Windsor Locks; Peter Jon Draghi, Simsbury, both of Conn.

[73] Assignee: United Technologies Corporation, Hartford, Conn.

[21] Appl. No.: 586,135

[22] Filed: Jan. 16, 1996

[51] Int. Cl.$^6$ .................................................. B23K 9/09
[52] U.S. Cl. ............................................... 219/137 PS
[58] Field of Search ................. 219/137 PS, 130.51, 219/137 WM, 76.14, 76.15

[56] References Cited

U.S. PATENT DOCUMENTS

| | | | |
|---|---|---|---|
| 2,697,160 | 12/1954 | Williams | 219/8 |
| 3,068,352 | 12/1962 | Correy | 219/137 |
| 3,300,683 | 1/1967 | Weishaar | 315/205 |
| 3,349,219 | 10/1967 | Ramsey | 219/131 |
| 3,598,954 | 8/1971 | Iceland et al. | 219/131 |
| 3,894,210 | 7/1975 | Smith et al. | 219/131 |
| 4,180,720 | 12/1979 | Barhorst | 219/130.51 |
| 4,219,592 | 8/1980 | Anderson et al. | 219/76.15 |
| 4,403,135 | 9/1983 | Moyer et al. | 219/137 |
| 4,421,972 | 12/1983 | Duncan et al. | 219/137 |
| 4,808,055 | 2/1989 | Wertz et al. | 416/224 |
| 4,822,248 | 4/1989 | Wertz et al. | 416/192 |
| 4,861,965 | 8/1989 | Stava | 219/130.51 |
| 4,878,953 | 11/1989 | Saltzman et al. | 148/4 |
| 4,903,888 | 2/1990 | Clark et al. | 219/76.14 |
| 4,947,021 | 8/1990 | Stava | 219/130.51 |
| 4,963,715 | 10/1990 | Tuttle | 219/130.4 |
| 5,360,961 | 11/1994 | Ingall et al. | 219/137 |
| 5,466,905 | 11/1995 | Flowers et al. | 219/121.46 |

OTHER PUBLICATIONS

Destefan, Dennis, "Basics to Know when Choosing a GTAW Power Source", Jan. 1995, 6 pgs.

*Primary Examiner*—Clifford C. Shaw
*Attorney, Agent, or Firm*—Charles E. Sohl

[57] ABSTRACT

Variable polarity welding is used to repair coated articles, particularly gas turbine engine components. The variable polarity welding process is found to remove the coating during the welding process. This permits the elimination of costly steps which would otherwise be needed in the repair process.

12 Claims, 1 Drawing Sheet

VARIABLE POLARITY ARC TECHNOLOGY FOR THE REPAIR OF COATED ARTICLES

BACKGROUND OF THE INVENTION

This invention relates to a process for removing protective coatings during a weld repair process.

A variety of welding processes are known in which heating is accomplished by the passage of an electric current to form an arc.

Several current wave forms have been proposed. Direct current (D.C.) is commonly used. Alternating current (A.C.) is also used. When using D.C. the polarity of the electrode, relative to the workpiece, causes various effects. The heat generated by the arc is concentrated at the positive end of the arc (and is caused by the impact of electrons striking the positive conductor). Generally, it is desired to concentrate the heat in the workpiece. The arrangement termed DCEN (direct current, electrode negative) provides this result. The opposite configuration, DCEP makes the welding electrode positive and concentrates the arc heat into the welding electrode. While this is generally undesirable, being inefficient and potentially causing overheating, of the welding apparatus, it has the desirable effect of disrupting surface oxides on the workpiece and is therefor sometimes used in welding metals which form tenacious oxides (Al, Mg, Ti, Be and alloys including nickel base superalloys).

It is also known to use variable polarity current, usually square wave D.C. with alternating positive and negative current pulses. Typically the current cycle is asymmetric. Variable polarity current welding can produce an advantageous combination of the benefits of DCEN and DCEP welding.

Variable polarity welding is discussed in the following U.S. Pat. Nos.: 2,697,160; 3,068,352; 4,403,135; 4,421,972; 5,360,961 and 5,466,905. The contents of these patents are incorporated herein by reference.

U.S. Pat. Nos. 4,403,135 and 4,421,972 cite the ability of the variable polarity welding process to remove superficial oxide surface layers. In spite the numerous variable polarity welding technology patents, applicants are unaware that any of this prior art has suggested that variable polarity welding can be used to remove anything beyond superficial surface oxides.

The present invention arises from the unexpected observation that variable polarity welding techniques can remove protective coatings such as those commonly used on superalloys in gas turbine engine applications. Such coatings include aluminide coatings formed by the diffusion of aluminum into the substrate and overlay coatings which are typified by the acronym MCrAlY where M is a material selected group insisting of iron, nickel, cobalt and mixtures of nickel and cobalt, with chromium, aluminum and yttrium. Aluminide coatings are described in U.S. Pat. Nos. 4,132, 816 and 4,148,275, and overlay coatings are described in U.S. Pat. RE 32,121.

Such coatings combat oxidation and corrosion at high temperatures and modem gas turbine engines use such protective coatings especially in hot sections.

With the development of gas turbine engine technology, engines life has increased significantly and this results in a increased emphasis on the repair and refurbishment of gas turbine engines components. Such refurbishment often requires the stripping of the preexisting coatings so that, for example, the underlying substrate can be weld repaired. Stripping is necessary because coating compositions optimized for oxidation and corrosion resistance generally have inferior mechanical properties to the properties of the substrate incorporation of the coating material into the weld reduces the weld properties. Such stripping is a tedious process which usually involves costly hand work. Usually, parts are masked with an inert coating which protects the areas from which the coating should not to be stripped. Actual coating removal is then accomplished by chemical means. Coatings may also be removed by mechanical means such as grinding which is also a delicate task especially since the wall thickness of the parts to be repaired is often only on the order of 1 to 3 mm and the grinding operations can easily remove excess material requiring that the part be scrapped.

According to the present invention it has been surprisingly and unexpectedly observed that when variable welding technology is applied to coated parts, including coated parts which have been used in engine service, that such protective coatings can be removed concurrently with weld repair. Such removal will most commonly be combined with a weld repair process but maybe performed without the addition of filler material if desired. Other known attributes of variable polarity welding such as the ability to maintain the welding process using low current levels thereby reducing heat input and the possibility of component distortion also contribute to the desirability of the present invention process.

DESCRIPTION OF THE PREFERRED EMBODIMENT

The contents of U.S. Pat. Nos. 5,466,905 and 5,360,961 are incorporated herein by reference for purposes of describing the variable polarity welding process. These patents show the use of this process on uncoated articles and on articles having thin oxide layers. U.S. Pat. Nos.3,300,683, 3,598,954 and 4,963,715 are expressly incorporated herein by reference for purposes of describing power supplies which are known in the art to have applicability in the variable polarity welding process. One such power supply which has been used in the development of this invention with great success is that provided by the Libardi Engineering Company of Hamilton Ontario, Canada known as the LTP 201-VP model power supply.

In general, the welding parameters used are those conventionally used in variable polarity welding. We have found that the ratio of negative current (DCEN) to positive current (DCEP) during the variable polarity cycle should range from about 70:30 to about 90:10 and the frequency of the variable polarity cycle should be in the range about 10–1,000 Hz.

It is a surprising and unexpected result that the variable polarity welding process which has been known in the art for at least 35 years, produces such an unexpected result in the repair of coated components. The observation that variable polarity coating can remove relatively thick coatings, on the order of 0.001 to 0.010 inches is not suggested by anything in the prior art.

It is suggested in the art that oxide layers can be removed but such layers have thickness which are one to two orders of magnitude less than the coating thicknesses which the inventors have observed that the variable polarity welding process can remove.

Figure 1:
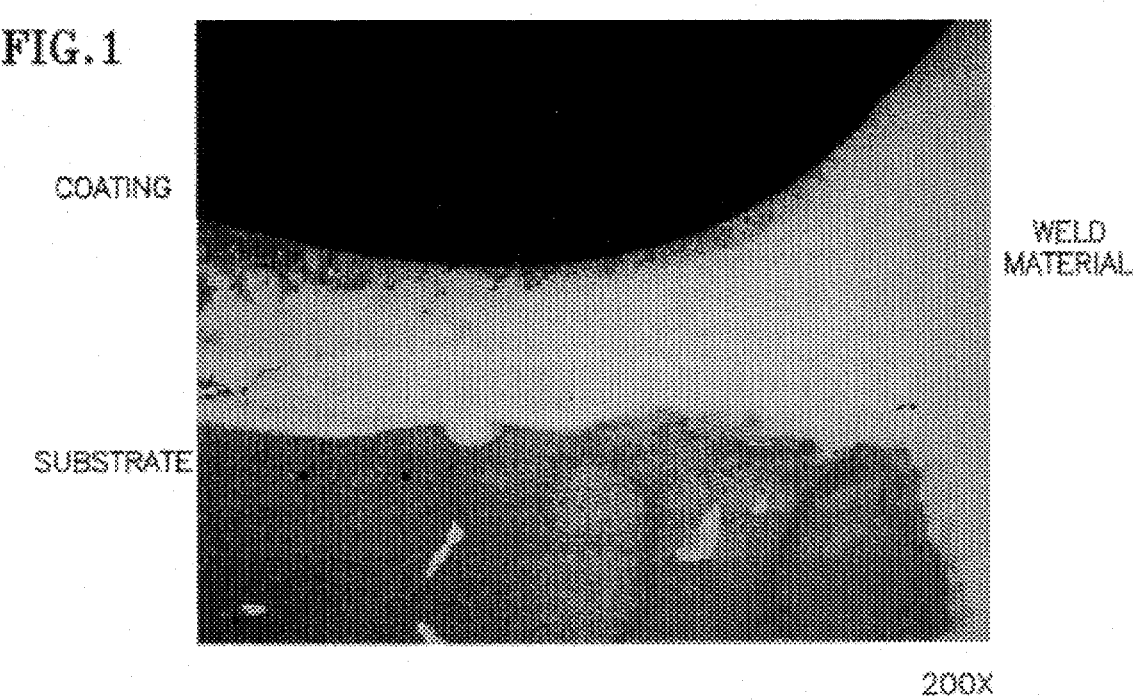
FIG. 1 is a photomicrograph of a coated article welded according to the invention.
Figure 2:
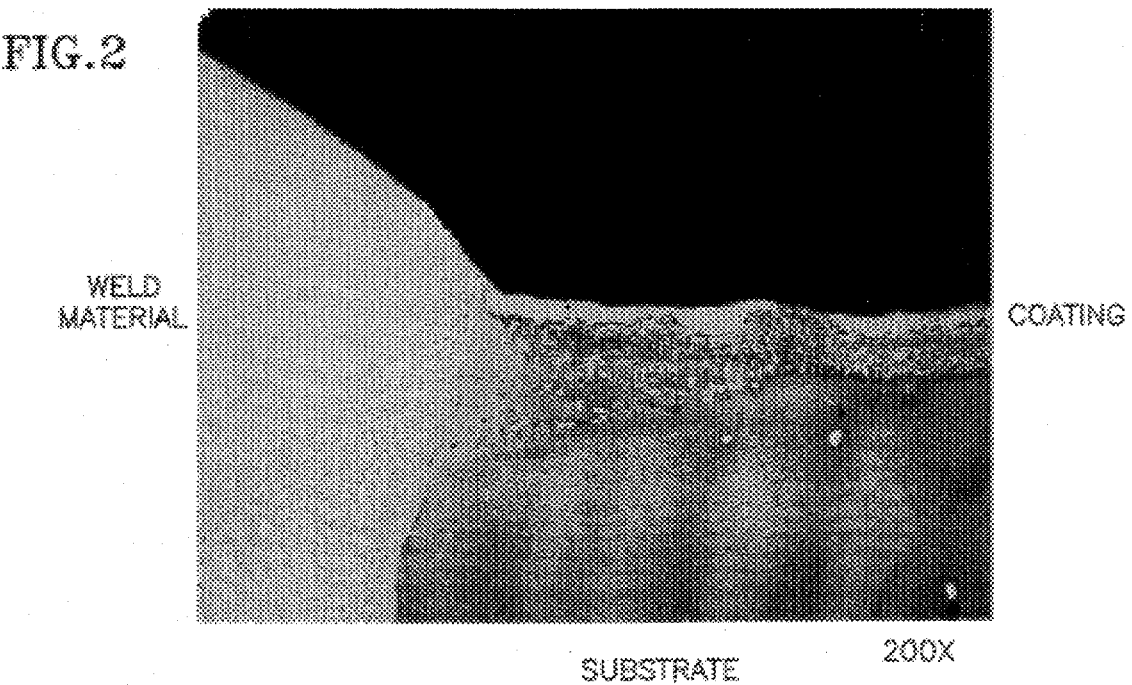
FIG. 2 is a photomicrograph of a coated article welded using A.C. welding.

FIG. 2 in U.S. Pat. No. 5,360,961 illustrates in schematic form a welding process in which an arc is formed between a tungsten electrode and the workpiece. Weld filler material in wire form is added into the molten pool formed in the workpiece by the action of the electric welding arc. This figure is typical of the set up for variable polarity welding. We have used wire feed to put filler material unto the workpiece, however, powder feed is a fully equivalent technique for the purposes of this invention. FIG. 1 in U.S. Pat. No. 5,466,905 illustrates in some detail a possible configuration for a tungsten inert gas welding procedure using a variable polarity welding power supply with powder feed.

A typical range of current is from about 5 to about 50 amps. Lower currents make arc maintenance difficult and higher currents cause excessive workpiece heating. A preferred current range is 6–35 amps. Those skilled in the art will recognize that during polarity reversals, especially at lower frequencies of reversal, it may be necessary to use auxiliary electrical means to maintain a stable arc. Generally these means comprise either a high frequency high voltage low current which is superimposed on the welding current or the use of electronic circuit means which provides a high voltage capacitive discharge at each polarity reversal to insure that the arc restarts. The use of high frequency AC currents with variable polarity welding is known from U.S. Pat. No. 3,068,352 and the use of the capacitive of discharge means is shown in U.S. Pat. No. 4,963,715.

Experimental work confirming the utility and value of the invention involved the weld repair of turbine blade tips. The turbine blade were from Pratt & Whitney PW4000 series engines which power wide body aircraft and produce from about 50,000 to about 100,00 pounds of thrust. A typical blade tip geometry would comprise an air foil shape with a major axis length of 30–60nm and a minor axis width of about 2–6 mm. Blade compositions included the alloys listed in Table 1, presented in weight percent.

The blades repaired had been used in engine operation for several thousand hours. The blades were coated with protective aluminide coatings having a thickness of about 1.5–5 mils.

Blades were repaired with both nickel and cobalt based filler alloys supplied in the form of wires having diameter in the range of 0.020–0.045 inches. Filler alloy compositions are shown in Table 2 (weight percent). As a general rule, cobalt filler materials are used to repair parts which operate at the highest temperatures.

A welding power supply (LTP201A-VP) produced by the Libardi Engineering Company was employed.

The welding process was manually controlled although the invention also has utility in automated welding processes. Argon gas was used as the inert shielding gas.

Using manual welding typical weld layer thicknesses were 0.020–0.045 inch per pass. About 4 minutes was required to apply one pass on the blade tips and multiple passes were used to apply weld repair layers up to 0.125 in. thick. This is entirely consistent with prior art weld repair of the same blades, except that in the prior art elaborate steps are taken to locally mechanically and/or chemically strip the protective coating from the part to be weld repaired.

In the assignee's current repair process, it is an objective to completely refurbish PW4000 turbine blades in a period of 45 days. This includes blade tip repair and various other repair and inspection operations. Applicant estimates that 3–4 days can be saved by eliminating the need to strip protective coatings prior to weld repair.

FIG. 1 is a photomicrograph of an aluminide coated turbine blade tip which has been weld repaired as described above. It can be seen that the dark colored aluminide coating has been removed by the variable polarity welding operation. The light colored weld material appears to have flowed along the interface between the coating and the substrate, lifting the coating from the substrate.

FIG. 2 is a photomicrograph of a similar aluminide coated blade which was weld repaired using A.C. welding. It can be seen that rather than having been removed (as shown in FIG. 1) the coating appear to be mixed with the weld layer.

TABLE I

|    | PWA1422 | PWA1426 | PWA1480 | PWA1484 |
|----|---------|---------|---------|---------|
| Ni | Bal     | Bal     | Bal     | Bal     |
| Co | 10      | 12.6    | 5       | 10      |
| Cr | 9       | 6.4     | 10      | 5       |
| Al | 5.0     | 5.9     | 5.0     | 5.7     |
| Ti | 2.0     | —       | 1.5     | —       |
| W  | 12      | 6.4     | 4       | 5.9     |
| Mo | —       | 1.7     | —       | 1.9     |
| Ta | —       | 4       | 12      | 8.7     |
| Cb | 1.0     | —       | —       | —       |
| Re | —       | 3       | —       | 3.0     |
| Hf | 1.6     | 1.5     | —       | .1      |
| Cb | —       | —       | —       | —       |
| B  | .015    | .013    | —       | —       |
| Zr | —       | .08     | —       | —       |
| C  | .14     | .01     | —       | —       |

TABLE 2

|    | PWA795 | IN625 | PWAC4 | PWAC6 |
|----|--------|-------|-------|-------|
| Ni | 15     | Bal   | Bal   | Bal   |
| Co | Bal    | —     | —     | —     |
| Cr | 20     | 21.5  | 19    | 19.5  |
| W  | 9      | —     | —     | —     |
| Al | 4.4    | .2    | 1.0   | .65   |
| Ta | 3.0    | —     | 7.3   | 5.3   |
| Hf | 1.1    | —     | —     | —     |
| Ti | .2     | .2    | —     | 1.0   |
| Y  | .04    | —     | —     | —     |
| C  | .35    | .05   | .01   | .01   |
| Mn | —      | .2    | .62   | 1.2   |
| Mo | —      | 9     | 3.5   | 3.6   |
| Cb | —      | 3.6   | 4.75  | 3.3   |
| B  | —      | —     | .015  | .015  |
| Fe | —      | 2.5   | 12.5  | 15.5  |
| Si | —      | .2    | —     | —     |

What is claimed is:

1. In the method of weld repairing a superalloy substrate having on its surface a protective coating selected from the groups consisting essentially of aluminide coatings, overlay coatings, ceramic thermal barrier coatings, and combinations thereof, the improvement which comprises:

using a variable polarity welding system whereby the protective coating is removed as a part of the welding process.

2. A method as in claim 1 wherein the coating is an aluminide coating.

3. A method as in claim 1 wherein the coating is an overlay coating.

4. A method as in claim 1 wherein the coating is on a superalloy gas turbine engine component which has been used in engine operation.

5. A method as in claim 1 wherein the ratio of negative to positive current is between 70:30 and 90:10.

6. A method as in claim 1 wherein the welding current is less than about 50 amps.

7. A method of removing a protective surface coating selected from the group consisting of aluminide and overlay coatings and combinations thereof, from a superalloy substrate, which comprises using a variable polarity welding power supply and striking an arc between said coated superalloy substrate and an electrode, to form a localized molten region in said superalloy substrate, wherein the arc is DCEN for 70–90% of the variable polarity current cycle and DCEP for the balance of said cycle, the current is between about 5 and 50 amperes and the frequency of the variable polarity cycle is from 10 to 1000 Hz.

8. A method as in claim 7 in which said coating is an aluminide coating.

9. A method as in claim 7 in which said coating is an overlay coating.

10. A method as in claim 7 wherein the variable polarity current is between about 6 and 35 amperes.

11. A method as in claim 7 wherein the ratio of DCEN to DCEP current is greater than 80:20.

12. A method as in claim 7 wherein metallic filler material selected from the group consisting of nickel and cobalt alloys is added to the molten zone.

* * * * *